United States Patent [19]

Lu

[11] Patent Number: 4,790,098

[45] Date of Patent: Dec. 13, 1988

[54] PLANAR TYPE CAST NET FOR FISHING

[76] Inventor: Pang C. Lu, No. 22, Chun Fu Lane, Chun Tsu Village, Siu Swei Hsiang, Changhua, Taiwan

[21] Appl. No.: 118,155

[22] Filed: Nov. 6, 1987

[51] Int. Cl.$^4$ .............................................. A01K 73/00
[52] U.S. Cl. ......................................................... 43/7
[58] Field of Search ........................ 43/7, 14, 100, 102

[56] References Cited

U.S. PATENT DOCUMENTS

| | | | |
|---|---|---|---|
| 876,148 | 1/1908 | Cloud | 43/8 |
| 1,154,563 | 9/1915 | Dorsey | 43/8 |
| 1,762,881 | 6/1930 | Nicolayson | 43/7 |
| 2,723,481 | 11/1955 | Schwartz | 43/7 |

Primary Examiner—Gene P. Crosby
Attorney, Agent, or Firm—Ladas & Parry

[57] ABSTRACT

A casting net is disclosed constructed of a circular net with a ring-shaped element fitted in its center. The circumference is fitted with a bottom rope holding weight elements, weight blocks or chain-weight chains. The cast-net hanging from its central ring-shaped element drops to form a conical cast-net when retrieved. During casting, the integral net element spreads to become a planar net shape which differs from that of the traditional cylindrical cast-net. This invention reduces seam stitching and makes it easier to spread for maximum effect. Moreover, the central ring-shaped element, i.e. the lower and the upper retaining ring elements, can be easily fitted to the meshes in the center of the cast-net in a secure simplified manner.

8 Claims, 3 Drawing Sheets

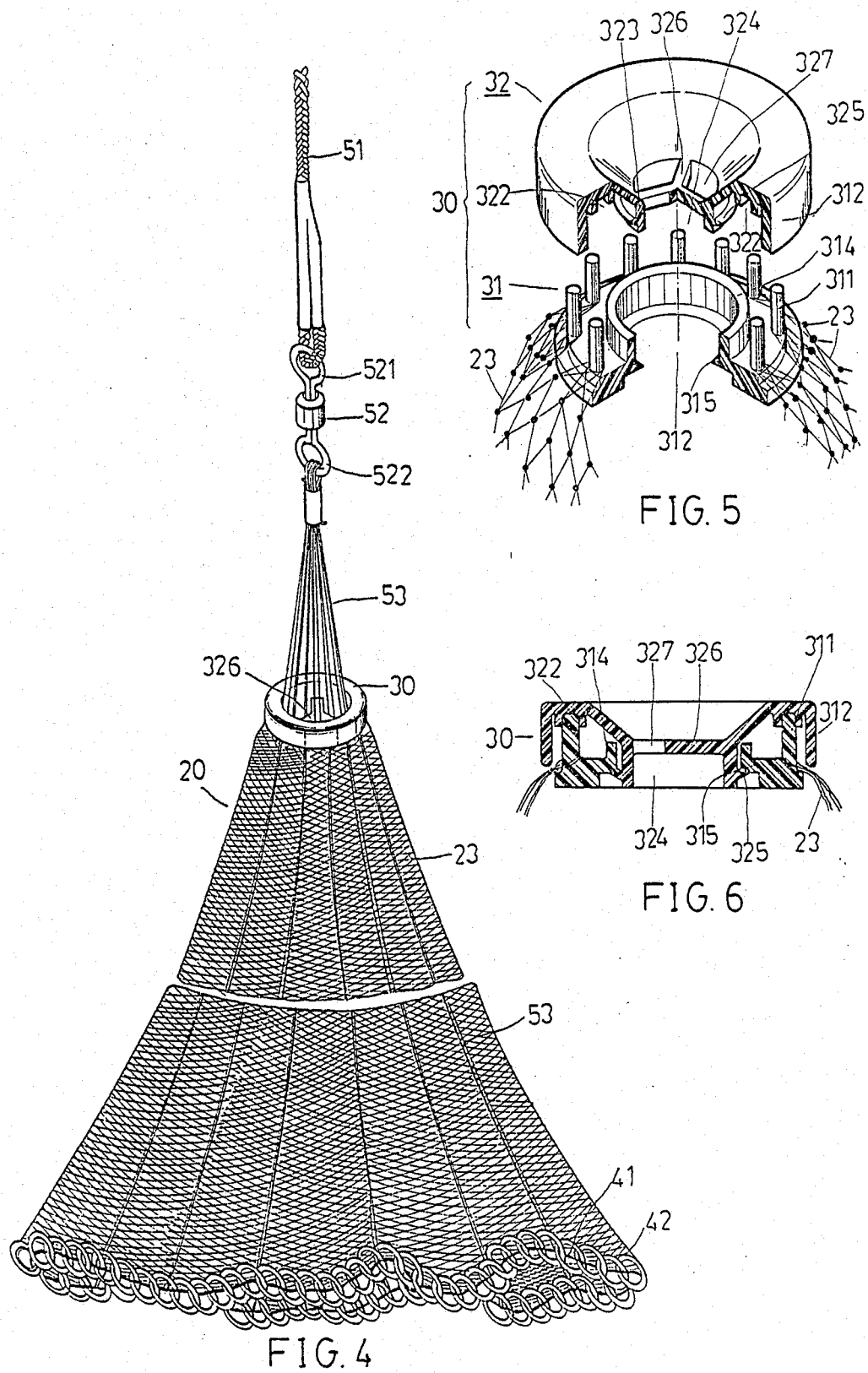

PLANAR TYPE CAST NET FOR FISHING

BACKGROUND OF THE INVENTION

The invention is related to a type of cast net for use in fishing, in particular, to a kind of planar type cast net, which is simpler and more conventient to manufacture.

The cast net is one kind of traditional fishing devices but its utilization is not familiar to the average person. However, we can see, in movies or on television, fishermen throwing a cast net on the water to spread over the fish and catching them by gradually hauling up the drawing rope fastened at the center of the cast net. For certuries, the construction and manufacturing methods of cast-nets have changed very little. In order to facilitate review and comprehension, the old style cast-net construction with reference to enclosed figures is described as follows:

Firstly as shown in FIGS. 1 and 2, the conventional cast-net is of a conical construction i.e. narrower at the top and very wide at the bottom to cover a large area of water. Therefore, the lower part of the cast-net consists quite a few pieces of net of different lengths joined together. As shown in FIG. 2, the smaller sized cast-net is constructed of three net elements A, B and C where A is the shortest and is located at the top, B is in the middle and C, the longest portion, is at the bottom. The three net elements A, B, C, must be manually stitched together in a manner so that their side edges (A1 and A2, B1 and B2, C1 and C2) are correspondingly stitched into three cylindrical net rings of different inner diameters. Then, the bottom edge A4 of net element A and the top edge B3 of net element B are correspondingly stitched together. The bottom edge B4 of net element B is stitched together with the top edge C3 of net element C.

This amount of manual stitching consumes a great deal of time and man power. Furthermore, faulty joining of the different lengths (A4 B3, and B4 C3) may result in overlapping and wrinkles which may adversely affect the spread of the cast-net.

Secondly, the top edge A3 of the conventional cast-net is fastened on a fixing ring (12) by a rope (11). Because the top edge A3 has numerous tiny meshes, it takes many man hours to fasten the individual meshes to the fixing ring (12) by the rope and in some cases where the rope (11) fails to get through correctly and only partly fastens the top edge A3 of the element, it is liable to loosen and fall apart due to the large forces which occur during the use of the cast-net and therefore quality of the net would be greatly impaired.

The inventor has found that with present labor costs and difficulty in finding adequate labor, the conventional cast-net construction is a high cost product which is not competitive in world markets. Therefore, the present invention provides a cast-net for fishing which is easier to manufacture, thus saving in manpower requirements, and upgrading the quality of the nets.

SUMMARY OF THE INVENTION

The major objective of the invention is to provide a kind of planar type cast-net in order to reduce the joint stitching so as to make manufacture easier and less expensive.

The secondary objective of the invention is to provide a kind of cast-net formed directly from a plane into a conical shape which is different from the conventional cylindrical cast-net. As the cast-net itself is in planar shape, it can be efficiently spread when cast and it is easily used.

Another objective of the invention is to provide a kind of cast-net formed directly on a plane with the top (or center) meshes of the planar type cast-net fixed into a special retaining ring in a time saving and simplified manner.

BRIEF DESCRIPTION OF THE DRAWINGS

FIG. 4 is an elevational view of the cast-net made of the net elements in FIG. 3.

FIG. 5 is an elevational view of the disassembled retaining ring in FIG. 4.

FIG. 6 is a sectional view of the combination of the retaining ring in FIG. 4.

DETAILED DESCRIPTION OF THE PREFERRED EMBODIMENT

In order to achieve the objective stated in the summary, the distinctive features of the invention are as follows:

The cast-net itself is a co-planar net element of which the circumferential the edge is tailored approximately into a circular shape and the lower edge of the net element has numerous weights attached by use of ropes. It makes an updated conical cast-net solely by pulling up the net elements by the central retaining ring so that the shortcomings of numerous seams in the traditional cast-net are overcome. Furthermore, the invention meets the requirement of the cast-nets main requirement condition, to spread planarily, as the cast-net itself is made in that shape which is completely different from the traditional cast-net made in a cylindrical construction and spread downward by layers. In other words, the invention has got rid of the prior art construction which uses numerous seams. Instead, the invention employs a planar shaped net which is seamless or has fewer seams.

Another feature of the planar cast-net of the present invention is the retaining ring at the center which, in one embodiment, includes:

(1) a lower retaining ring element having a ring shape, of which the upper surface, is provided with a series of small posts, and in a proper position on the inner ring surface, there is the lower engaging lug;

(2) an upper retaining ring element having a shape symmetric to the lower retaining ring element. Corresponding to the position and number of the small posts on the lower retaining ring, numbers of hole grooves are provided on the under surface of the upper retaining ring element to allow the insertion of the small posts. Also there is a corresponding engaging lug on the inside of the under surface to connect the two rings firmly together.

The small posts on the lower retaining ring are for the hanging and positioning of the central meshes of the cast-net. The upper retaining ring element connects with and covers the lower retaining ring element by inserting the small posts into the corresponding holes thereby preventing the meshes from falling apart and joining the upper and lower rings into an integral unit.

Figure 3:
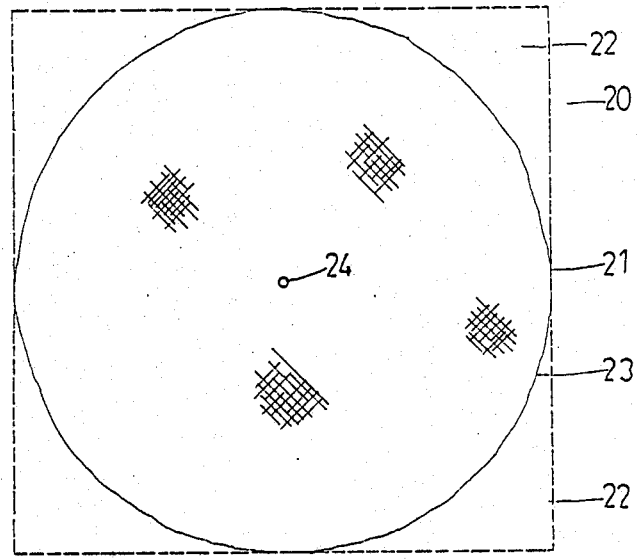
FIG. 3 illustrates the spreading plan of the planar type cast-net of the present invention.

As shown in FIG. 3, the net element (20) of the cast-net in the invention is made from a square net element (21) of a designated size are trimmed the at four corners (22) (as shown by dotted lines in the figure). The central portion of the net element (20) is set into a round hole (24). When the central portion of the cast-net is pulled up, a conical cast-net gradually diverging downward is formed. If necessary, a small piece of reinforced net (not shown in figure) can be patched around the hole (24).

As shown in FIG. 4, the centre of the net element (20) in FIG. 3 is fixed into a retaining ring element (30) (which will be described later). The lower edge (shown in FIG. 4) of the net element (20) is fixed with a bottom rope (41) carrying a series of chain-shaped weights (42) (or by numerous weight blocks as weight element). In addition, it is equipped with a pulling rope (51) of which one end is fixed with a connector (52). Both ends of the connector are equipped with independently rotating rings (521) (522) respectively. The rotary ring (522) is fastened with numerous pulling cords (53) which pass through the central holes of the retaining ring element (30) and extend into the net element (20). The cords (53) are fastened to the bottom rope (41) in evenly around the edge.

As shown in FIG. 5, the detailed construction of the retaining ring element (30) in FIG. 4 is illustrated. The retaining ring element (30) includes a lower retaining ring element (31) and an upper retaining ring element (32). The lower retaining ring element takes a disc shape and is fitted with several small posts (311) of optional shape used for hooking and gripping the net. The centre of the lower retaining ring element defines a round hole (312) with a cylindrical shaped engaging ring (314) of which the bottom edge is equipped with a ring-shaped first engaging lug (315). The upper retaining ring element (32) is also disc shaped corresponding to the contours of the lower retaining ring element. The upper retaining ring element has an outer ring portion (312) with diameter slightly larger than that of the lower retaining ring element (31). On the inner side of the lower surface, it has numerous small round holes (or a ring groove) (322) to accomodate the insertion of the small posts (311). It has an inner ring portion (323) and an round central hole (324). At the bottom outer edge of the inner ring portion (323), it is equipped with the second engaging lug (325) in the correct position. At the top end of the inner round hole (324), there is a Y-shaped rib strip (326) to divide the round central hole into three openings (327).

The use of the retaining ring elements (31), (32) is described as follows:

The meshes around the small round hole (24) in the centre of net element (20) are tightly connected together by use of the retaining ring elements (31) (32). The meshes (241) around the edge of the small round hole (24) are fastened to hang on the small posts (311) of the lower retaining ring element (31) evenly and in sequence. Then, the upper retaining ring element (32) is placed on top of and engaged with the lower retaining ring element (31) so that the lower and the upper engaging lugs (315) (325) are firmly interlocked to prevent seperation. When the lugs are interlocked, the small posts (311) of the lower retaining ring element (31) are positioned into the small round holes or ring groove (322) of the upper retaining ring element (32) to hold the meshes (241) firmly on the small posts (311) so that they are unable to come off. The ring-shaped unit composed by the lower and the upper retaining ring elements (31) (32) is located at the centre of the cast-net to prevent the centre of the cast-net from opening and to facilitate handling. By taking advantage of the Y-shaped rib strip's (326) partitions, the pulling cords (53) can easily pass into the cast-net and be fastened to the bottom rope (41) separately.

Figure 1:
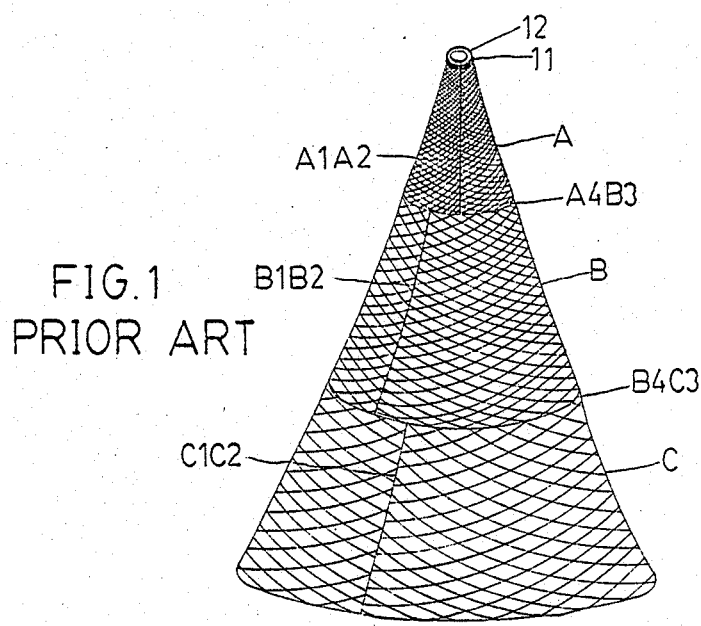
FIG. 1 illustrates a traditional cast-net.
Figure 2:
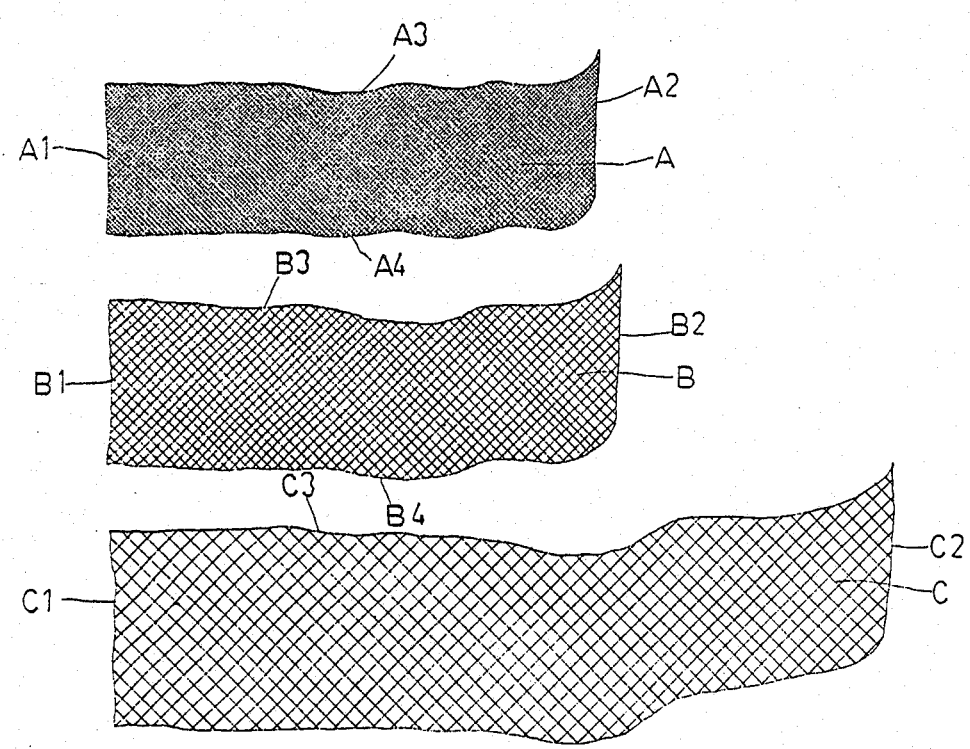
FIG. 2 illustrates the individual net elements of a traditional cast-net.
Figure 7:
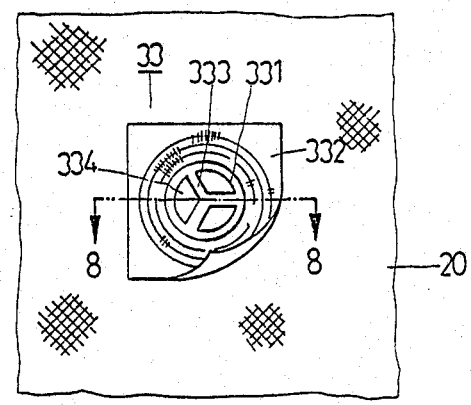
FIG. 7 is a partial plan view of the central portion of the cast-net showing the retainin ring in FIG. 4 in another preferred embodiment.
Figure 8:
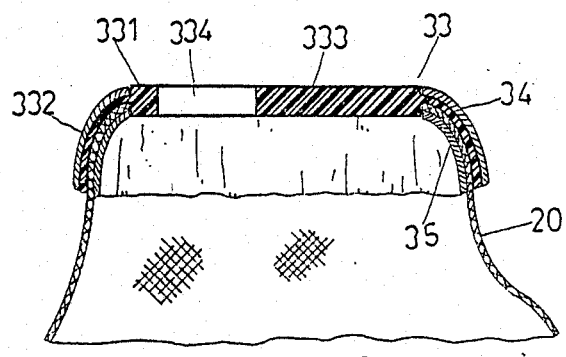
FIG. 8 is a cross sectional view of the retaining ring of FIG. 7 taken at 8—8 in FIG. 7.

FIGS. 7 and 8 depict another embodiment of the retaining ring. Instead of fixing the net by the retaining ring elements (31) (32), the embodiment of FIGS. 7 and 8 is fitted with a retaining ring plate (33) made of suitable soft plastic material formed as an integral body. Its centre is a thicker ring-shaped part (331) while the periphery is a thinner piece (332). The central hole of the ring-shaped portion can have several rib strips (333) to divide the hole into several openings (334). The retaining ring element (33), with upper and lower cloth piece (34) (35) attached, is stitched around the small round hole (24) at the centre of the cast-net element (20) to equip the centre with a ring-shaped piece (331) for the cords to pass through (63) to be fastened on to the bottom rope. The version is a unique use of the invention. As the upper section of the traditional cast-net is cylindrical in shape and its top edge (or centre) has numerous mesh loops, it is very tedious to fasten each loop on to a fixing ring (12) (as shown in FIG. 2) one after another and it is impossible to directly stitch the ring-shaped plate (33) on to the net element A as in the above-mentioned simplified method which is one of the distinctive features of the invention.

Based on the descriptions of the two above-stated versions with reference referring to the figures, it can be understood that the manufacture of the cast-net of the Invention is different from the traditional, multi-section, cylindrical construction because the cast-net member of the Invention is of planar construction. The Invention has two distinctive features; (1) the reduction in the number of seams, which makes it easier to spread when casting on water, and (2) the centre (top edges) meshes can easily be connected to the ring-shaped element.

I claim:

1. A net used for fishing, the net comprising:
   (a) a net element having a generally circular configuration when planarly disposed;
   (b) a number of counterweight elements attached to the net element at an outer periphery thereof;
   (c) a ring-shaped element attached to said net element at generally the center thereof, said ring-shaped element comprising a top element and a bottom element, said top and bottom elements being fastened to different sides of said net element; and
   (d) a plurality of rope which passes through said ring shaped element, one end of each rope being coupled to said periphery of said net element, the other end of each rope being fastened together.

2. The net of claim 1, wherein including a bottom rope for connecting said plurality of rope to the periphery of said net element.

3. The net of claim 2, wherein said bottom rope also couples said counter weights to the net elements at the periphery thereof.

4. The net of claim 1 wherein, one of said top and bottom elements includes a plurality of post projected therefrom and the other of said top and bottom elements includes means for receiving a distal end of said posts, said posts being adapted to engage said net element, said top and bottom element further including means for locking said top and bottom elements together.

5. The net of claim 1 when said ring shaped element is made of a plastic material which is stitched to said net element.

6. A planar casting net comprising:
a net element having a generally circular configuration when planarly disposed;
a ring-shaped element for central attachment to said net element, said ring-shaped element being comprised of disk-shaped lower and upper retaining rings, said lower retaining ring having numerous small posts, said posts being capable of passing through and holding said net element, said upper retaining ring defining openings in its surface for receipt of said posts;
engagement lugs associated with said upper and lower retaining rings to lock said upper and lower retaining rings together to hold said net element in said ring-shaped element;
a bottom rope for attachment to the outer periphery of said net element; and
weights for attachment to the outer periphery of said net element, such that upon pulling of said net element by means of said ring-shaped element, said net element takes on a conical shape.

7. The planar casting net of claim 6 wherein said ring-shaped element defines an opening and wherein said casting net further comprises a Y-shaped element located in the opening defined by said ring-shaped element to divide said opening into three vent openings.

8. A planar casting net comprising:
a net element having a generally circular configuration when planarly disposed;
a ring-shaped element having upper and lower outer margins for central attachment to said net element, said ring-shaped element being made of plastic and comprised of upper and lower cloth pieces, said upper cloth piece being attached to the upper outer margin of said ring-shaped element, said lower cloth piece being attached to the lower outer margin of said ring-shaped element such that the ring-shaped element may be stitched to said net element;
a bottom rope for attachment to the outer periphery of said net element; and
weights for attachment to said rope such that upon pulling of said net element by means of said ring-shaped element, said net takes on a conical shape.

* * * * *